(12) United States Patent
Binzaid

(10) Patent No.: US 11,768,302 B2
(45) Date of Patent: Sep. 26, 2023

(54) TECHNOLOGIES FOR MULTIFUNCTION SENSOR DEVICES AND MICROCONTROLLER-BASED INTERFACE MODULE

(71) Applicant: THE TEXAS A&M UNIVERSITY SYSTEM, College Station, TX (US)

(72) Inventor: Shuza Binzaid, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 17/510,814

(22) Filed: Oct. 26, 2021

(65) Prior Publication Data

US 2022/0128723 A1  Apr. 28, 2022

Related U.S. Application Data

(60) Provisional application No. 63/106,511, filed on Oct. 28, 2020, provisional application No. 63/105,439, filed on Oct. 26, 2020, provisional application No. 63/105,437, filed on Oct. 26, 2020, provisional application No. 63/105,441, filed on Oct. 26, 2020, provisional application No. 63/105,442, filed on Oct. 26, 2020.

(51) Int. Cl.
*G01T 7/00* (2006.01)

(52) U.S. Cl.
CPC .................................. *G01T 7/00* (2013.01)

(58) Field of Classification Search
CPC ................................. G01T 7/00; G01T 1/00
See application file for complete search history.

(56) References Cited

U.S. PATENT DOCUMENTS

| 4,939,407 A | * | 7/1990 | Goo | H01L 37/02 310/366 |
| 5,783,519 A | * | 7/1998 | Morrison | B41M 5/426 503/227 |
| 2007/0096066 A1 | * | 5/2007 | Yoshida | H01B 1/20 252/511 |

FOREIGN PATENT DOCUMENTS

DE    4031210 A1 *  4/1992
JP  2009296703 A  * 12/2009

* cited by examiner

*Primary Examiner* — Kiho Kim
(74) *Attorney, Agent, or Firm* — Barnes & Thornburg LLP

(57) ABSTRACT

Technologies for multifunction sensor devices include a multifunction sensor having a pair of electrodes separated by a thin film polymer. The multifunction sensor is coupled to a nano-amplifier that receives a sensor signal and amplifies the sensor signal to generate an amplified sensor signal. A controller coupled to the nano-amplifier processes the amplified sensor signal based on the type of the multifunction sensor device to generate sensor data. The type of the multifunction sensor device may be a static charge sensor, a high-energy particle sensor, a microwave sensor, or an ultraviolet/X-ray sensor. The sensor data may be output, for example, to an external computing device via a serial link.

18 Claims, 7 Drawing Sheets

TECHNOLOGIES FOR MULTIFUNCTION SENSOR DEVICES AND MICROCONTROLLER-BASED INTERFACE MODULE

CROSS-REFERENCE TO RELATED APPLICATIONS

This application claims the benefit of and priority to U.S. Patent Application No. 63/105,437, entitled "SENSOR DEVICE FOR DETECTION OF THE STATIC ENERGY FIELD IN SURROUNDING MEDIUM," which was filed on Oct. 26, 2020, U.S. Patent Application No. 63/105,439, entitled "SENSOR APPARATUS FOR DETECTION OF HIGH-ENERGY ATOMIC PARTICLES," which was filed on Oct. 26, 2020, U.S. Patent Application No. 63/105,441, entitled "COMPOSITE SENSOR APPARATUS FOR DETECTION OF ENERGY TRANSMISSION IN THE MICROWAVE ELECTROMAGNETIC SPECTRUM," which was filed on Oct. 26, 2020, U.S. Patent Application No. 63/105,442, entitled "ELECTRONIC MODULE WITH FIFO-AMPERE BIASED NANO-POWER AMPLIFIER FOR MULTIFUNCTIONAL SENSORS APPLICATIONS BY PARALLEL COMPUTING," which was filed on Oct. 26, 2020, and U.S. Patent Application No. 63/106,511, entitled "APPARATUS OF MULTIFUNCTIONAL SENSOR FOR ELECTROMAGNETIC WAVES OF RADIATION IN THE REGION OF UV AND X-RAY," which was filed on Oct. 28, 2020, each of which is incorporated by reference in its entirety.

BACKGROUND

Sensitive electronics may be damaged by environmental factors such as electromagnetic emissions, electrostatic discharge, ionizing radiation, and high-energy particles. Similar environmental factors may be harmful to human health. For example, many non-transmitted human diseases such as cancer may be caused by various electromagnetic emissions and ionizing radiation. Typical sensors to detect dangerous environments are large in size and/or weight and may detect only a single type of environmental hazard.

SUMMARY

According to one aspect of the disclosure, a multifunction sensor device includes a first electrode, a wherein the first electrode and the second electrode are flat, and a thin film polymer positioned between the first electrode and the second electrode. In an embodiment, each of the first electrode, the second electrode and the thin film polymer are flexible. In an embodiment, the first electrode is coated with an environmentally resistant coating.

In an embodiment, the first electrode extends from a first end to a second end, wherein the second end is pointed; the second electrode comprises a ring that surrounds the thin film polymer; and the second end of the first electrode extends beyond the ring of the second electrode.

In an embodiment, the first electrode comprises a metallic sheet; and the second electrode comprises a metallic sheet, wherein the first electrode and the second electrode have equal area. In an embodiment, the first electrode comprises a ring that defines a first aperture that opens onto the thin film polymer; and the second electrode comprises a ring that defines a second aperture that opens onto the thin film polymer. In an embodiment, the multifunction device further includes a second thin film polymer coupled to the first electrode, wherein the second thin film polymer is positioned opposite the thin film polymer.

In an embodiment, the first electrode comprises a partial ring that extends from a first end to a second end, wherein a slot is defined between the first end and the second end, and wherein the partial ring defines a first aperture that opens onto the thin film polymer; and the second electrode comprises a ring that defines a second aperture that opens onto the thin film polymer.

In an embodiment, the thin film polymer comprises a metallic nanoparticle layer. In an embodiment, the thin film polymer comprises aluminum nanoparticles. In an embodiment, the first electrode comprises a ring that defines a first aperture that opens onto the thin film polymer; and the second electrode comprises a ring that defines a second aperture that opens onto the thin film polymer. In an embodiment, the first electrode is coated with an anti-static coating.

According to another aspect, a system for multifunction sensor processing, the system comprises a multifunction sensor device, a nano-amplifier coupled to the multifunction sensor device, and a controller coupled to the nano-amplifier. The multifunction sensor device includes a first electrode, a second electrode, wherein the first electrode and the second electrode are flat, and a thin film polymer positioned between the first electrode and the second electrode. The nano-amplifier is configured to receive a sensor signal from the multifunction sensor device and amplify the sensor signal to generate an amplified sensor signal. The controller is configured to receive the amplified sensor signal from the nano-amplifier, process the amplified sensor signal based on a type of the multifunction sensor device to generate sensor data, and output the sensor data.

In an embodiment, the first electrode is coupled to a constant voltage source and the second electrode is coupled to the nano-amplifier. In an embodiment, the system further comprises a computing device coupled to the controller via a serial link. To output the sensor data comprises to output the sensor data to the computing device via the serial link.

In an embodiment, each of the first electrode, the second electrode and the thin film polymer of the multifunction sensor device are flexible. In an embodiment, the first electrode of the multifunction sensor device is coated with an environmentally resistant coating.

In an embodiment, the first electrode extends from a first end to a second end, wherein the second end is pointed; the second electrode comprises a ring that surrounds the thin film polymer; and the second end of the first electrode extends beyond the ring of the second electrode.

In an embodiment, the first electrode comprises a metallic sheet; and the second electrode comprises a metallic sheet, wherein the first electrode and the second electrode have equal area. In an embodiment, the first electrode comprises a ring that defines a first aperture that opens onto the thin film polymer; and the second electrode comprises a ring that defines a second aperture that opens onto the thin film polymer. In an embodiment, the multifunction sensor device further comprises a second thin film polymer coupled to the first electrode, wherein the second thin film polymer is positioned opposite the thin film polymer.

In an embodiment, the first electrode comprises a partial ring that extends from a first end to a second end, wherein a slot is defined between the first end and the second end, and wherein the partial ring defines a first aperture that opens onto the thin film polymer; and the second electrode comprises a ring that defines a second aperture that opens onto the thin film polymer.

In an embodiment, the thin film polymer comprises a metallic nanoparticle layer. In an embodiment, the thin film polymer comprises aluminum nanoparticles. In an embodiment, the first electrode comprises a ring that defines a first aperture that opens onto the thin film polymer; and the second electrode comprises a ring that defines a second aperture that opens onto the thin film polymer. In an embodiment, the first electrode is coated with an anti-static coating.

According to another aspect, a controller for multifunction sensor processing includes a sensor interface, a sensor processing manager, and an output interface. The sensor interface is to receive an amplified sensor signal from an amplifier coupled to a multifunction sensor device. The sensor processing manager is to process the amplified sensor signal based on a type of the multifunction sensor device to generate sensor data. The output interface is to output the sensor data.

In an embodiment, to process the amplified sensor signal comprises to convert the amplified sensor signal into the sensor data, wherein the sensor data comprises a plurality of digital sensor values. In an embodiment, to process the amplified sensor signal comprises to determine a coefficient based on the type of the multifunction sensor device and determine the sensor data as a function of the coefficient. In an embodiment, the type of the multifunction sensor device comprises a static charge sensor, a high-energy particle sensor, a microwave sensor, or an ultraviolet/X-ray sensor.

In an embodiment, to output the sensor data comprises to output the sensor data to a computing device via a serial link. In an embodiment, to output the sensor data comprises to store the sensor data with a data storage device.

According to another aspect, one or more computer-readable storage media comprise a plurality of instructions that, when executed, cause a controller to receive an amplified sensor signal from an amplifier coupled to a multifunction sensor device; process the amplified sensor signal based on a type of the multifunction sensor device to generate sensor data; and output the sensor data.

In an embodiment, to process the amplified sensor signal comprises to convert the amplified sensor signal into the sensor data, wherein the sensor data comprises a plurality of digital sensor values. In an embodiment, to process the amplified sensor signal comprises to determine a coefficient based on the type of the multifunction sensor device and determine the sensor data as a function of the coefficient. In an embodiment, the type of the multifunction sensor device comprises a static charge sensor, a high-energy particle sensor, a microwave sensor, or an ultraviolet/X-ray sensor.

In an embodiment, to output the sensor data comprises to output the sensor data to a computing device via a serial link. In an embodiment, to output the sensor data comprises to store the sensor data with a data storage device.

According to another aspect, a method for multifunction sensor processing includes receiving, by a controller, an amplified sensor signal from an amplifier coupled to a multifunction sensor device; processing, by the controller, the amplified sensor signal based on a type of the multifunction sensor device to generate sensor data; and outputting, by the controller, the sensor data.

In an embodiment, processing the amplified sensor signal comprises converting the amplified sensor signal into the sensor data, wherein the sensor data comprises a plurality of digital sensor values. In an embodiment, processing the amplified sensor signal comprises determining a coefficient based on the type of the multifunction sensor device and determining the sensor data as a function of the coefficient. In an embodiment, the type of the multifunction sensor device comprises a static charge sensor, a high-energy particle sensor, a microwave sensor, or an ultraviolet/X-ray sensor.

In an embodiment, outputting the sensor data comprises outputting the sensor data to a computing device via a serial link. In an embodiment, outputting the sensor data comprises storing the sensor data with a data storage device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
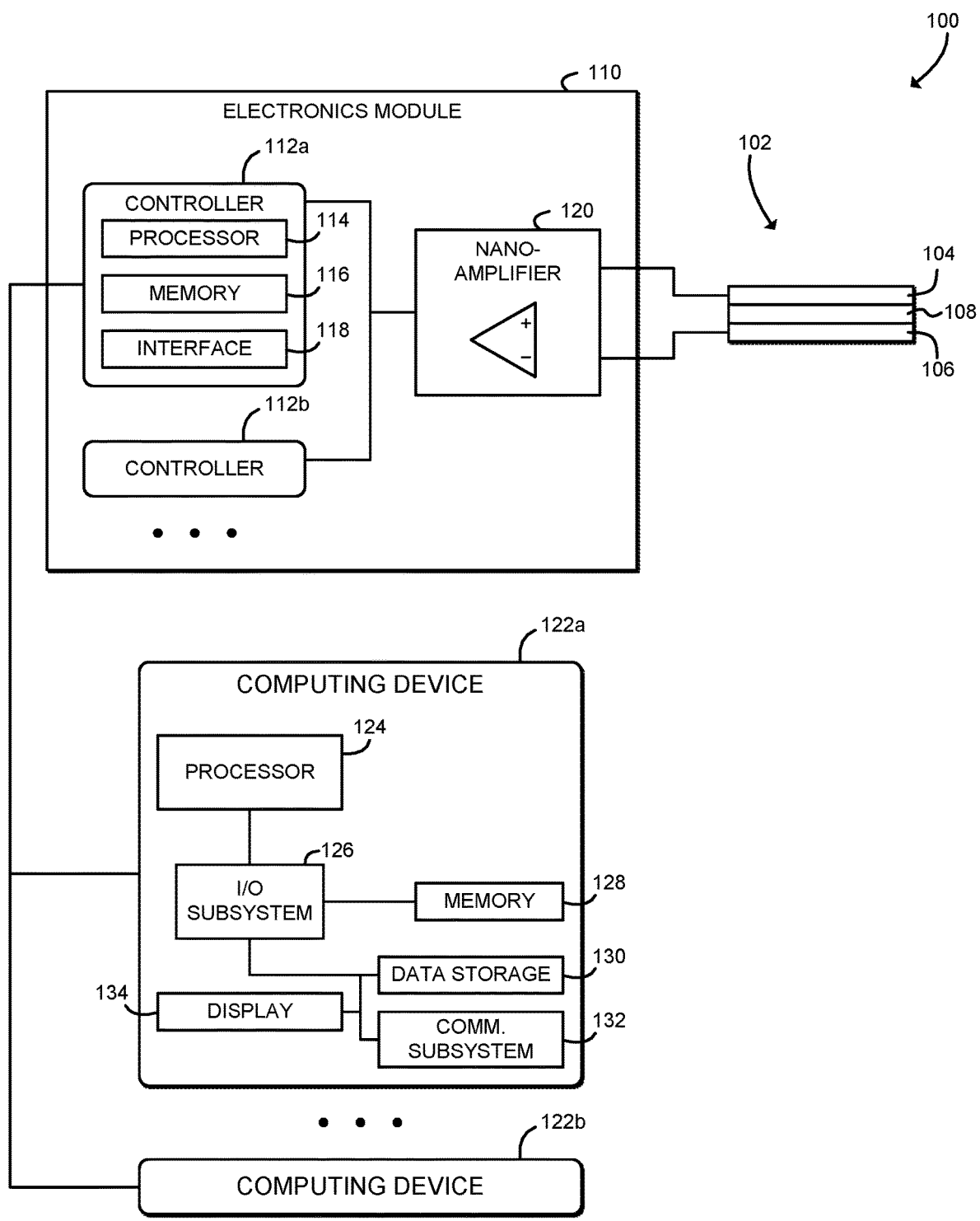
FIG. 1 is a simplified block diagram of at least one embodiment of a system for environmental sensing with a multifunction sensor device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for environmental sensing includes a multifunction sensor device 102 coupled to an electronics module 110 and one or more computing devices 122. In use, as described further below, the multifunction sensor device 102 monitors the environment for one or more factors such as electrostatic charge, ionized particles, high-energy particles, microwave radiation, ultraviolet radiation, X-ray radiation, ionizing radiation, or other phenomena. The electronics module 110 receives an electrical signal from the sensor 102 and processes that electrical signal to generate digital sensor data that may be communicated to an associated computing device 122 for display, storage, additional processing, or other purposes. Thus, the system 100 and the multifunction sensor devices 102 may detect multiple hazardous environmental factors in both earth surface and space environments. Further, as described further below, the multifunction sensor devices 102 may be constructed from durable and inexpensive materials, and may be water resistant or otherwise environmentally resistant. The multifunction sensor devices 102 may be flexible and thus may be incorporated into clothing, space suits, or other fabrics. The electronics module 110 may include multiple microcontrollers that enable parallel processing of sensor data generated by the multifunction sensor device 102. Additionally, the microcontroller-based electronics module 110 of the system 100 is modular and small in size and weight and may reduce the need for bulky equipment such as signal analyzers.

The multifunction sensor device 102 illustratively includes a pair of electrodes 104, 106 and a thin film polymer layer 108 positioned between the electrodes 104, 106. Each of the electrodes 104, 106 may be embodied as a thin, flexible layer of metallic material such as copper. Each electrode 104, 106 may have a disc shape, a rectangular shape, a ring shape, or any other appropriate shape. In some embodiments, each of the electrodes 104, 106 may have a similar shape and/or surface area, and in other embodiments each of the electrodes 104, 106 may have different shapes and/or surface areas. The polymer 108 may be embodied as a thin film polymer or polymer composite material that separates the electrodes 104, 106. In some embodiments, the polymer 108 may include metallic nanoparticles, a metallic nanoparticle layer, and/or a metallic nanoparticle coating. The polymer 108 provides a highly resistive path between the electrodes 104, 106 and a relatively small capacitive effect. The multifunction sensor device 102 including the electrodes 104, 106 and the polymer 108 is flexible, durable, and environmentally resistant (e.g., water resistant). In some embodiments, exposed surfaces of the electrodes 104, 106 may be coated, for example with an environmentally resistant coating (e.g., a non-corrosive polymer coating, a water resistant coating, vapor barrier, or other coating), with an anti-static coating, or with another coating. Potential embodiments of the multifunction sensor 102 are described further below in connection with FIGS. 2-7. Additionally, although illustrated as including a single multifunction sensor device 102, it should be understood that in some embodiments the system 100 may include multiple sensor devices 102.

As shown, the electrodes 104, 106 of the multifunction sensor device 102 are coupled to the electronics module 110. The electronics module 110 includes one or more controllers 112 coupled to a nano-amplifier 120. Although illustrated as including two controllers 112a, 112b, it should be understood that the electronics module 110 may include a different number of controllers 112, such as one controller 112 or three or more controllers 112. Each controller 112 may be illustratively embodied as any microcontroller, microprocessor, programmable logic controller, or other device capable of performing the functions described herein. To do so, the controller 112 may include a number of electronic components commonly associated with units utilized in the control of electronic and electromechanical systems. For example, the controller 112 may include, amongst other components customarily included in such devices, a processor 114 and a memory device 116. The processor 114 may be any type of device capable of executing software or firmware, such as a microcontroller, microprocessor, digital signal processor, or the like. The memory 116 may be embodied as one or more volatile and/or non-volatile memory device. The memory device 116 is provided to store, amongst other things, instructions in the form of, for example, a software routine (or routines) which, when executed by the processor 114, allows the controller 112 to process signals received from the sensor device 102 described herein. The controller 112 also includes an interface circuit 118, which may be embodied as any analog and/or digital electrical circuit(s), component, or collection of components capable of performing the functions described herein. The interface circuit 118 converts output signals (e.g., from the nano-amplifier 120 and/or the multifunction sensor device 102) into signals which are suitable for presentation to an input of the processor 114. In particular, in some embodiments the interface circuit 118, by an analog-to-digital (A/D) converter, or the like, converts analog signals into digital signals for use by the processor 114. Similarly, the interface circuit 118 may convert signals from the processor 114 into output signals which are suitable for presentation to other components of the system 100, such as the computing devices 122. It is contemplated that, in some embodiments, the interface circuit 118 (or portions thereof) may be integrated into the processor 114.

The nano-amplifier 120 may be embodied as a sub-nanowatt amplifier that acts as an analog signal buffer component for the electronics module 110. The nano-amplifier 120 is coupled to a power supply, such as a 5 V DC power supply (not shown). One of the electrodes 104, 106 of the sensor 102 (e.g., the electrode 104) is also coupled to the power supply. The other electrode 104, 106 (e.g., the electrode 106) is coupled to the nano-amplifier 120 as a reference/ground input. The nano-amplifier 120 amplifies signals received from the sensor 102 and generates an amplified output signal. The amplified output signal is provided to the controllers 112 for processing.

As shown, the electronics module 110 is coupled to one or more computing devices 122. Although illustrated as being coupled to two computing devices 112a, 112b, it should be understood that the electronics module 110 may be coupled to a different number of computing devices 122, such as one computing device 122 or three or more computing devices 122. Each computing device 122 may be embodied as any type of device capable of performing the functions described herein. For example, a computing device 122 may be embodied as, without limitation, a laptop computer, a netbook, a workstation, a desktop computer, a server, a rack-mounted server, a blade server, a network appliance, a web appliance, a tablet computer, a smartphone, a consumer electronic device, a distributed computing system, a multiprocessor system, and/or any other computing device capable of performing the functions described herein. As shown in FIG. 1, an illustrative computing device 122 includes a processor 124, an I/O subsystem 126, memory 128, a data storage device 130, and communication circuitry 132. Of course, the computing device 122 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 128, or portions thereof, may be incorporated in the processor 124 in some embodiments.

The processor 124 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 128 may be embodied as any type of volatile or non-volatile memory or data storage capable of performing the functions described herein. In operation, the memory 128 may store various data and software used during operation of the computing device 122 such as operating systems, applications, programs, libraries, and drivers. The memory 128 is communicatively coupled to the processor 124 via the I/O subsystem 126, which may be embodied as circuitry and/or components to facilitate input/output operations with the processor 124, the memory 128, and other components of the computing device 122. For example, the I/O subsystem 126 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 126 may form a portion of a system-on-a-chip (SoC) and be incorporated, along with the processor 124, the memory 128, and other components of the computing device 122, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. The communication circuitry 132 of the computing device 122 may be embodied as any communication circuit, device, or collection thereof, capable of enabling communications between the computing device 122 and remote devices. The communication circuitry 132 may be configured to use any one or more communication technology (e.g., wireless or wired communications) and associated protocols (e.g., Ethernet, Bluetooth®, Wi-Fi®, WiMAX, etc.) to effect such communication. Illustratively, each computing device 122 is coupled to the electronics module 110 via a serial link such as a serial port, a UART, or a similar interface.

As shown in FIG. 1, the computing device 122 may include a display 134. The display 134 may be embodied as any type of display capable of displaying digital images or other information, such as a liquid crystal display (LCD), a light emitting diode (LED), a plasma display, a cathode ray tube (CRT), or other type of display device. As described further below, the display 134 may be used to display sensor data processed by the electronics module 110.

Figure 2:
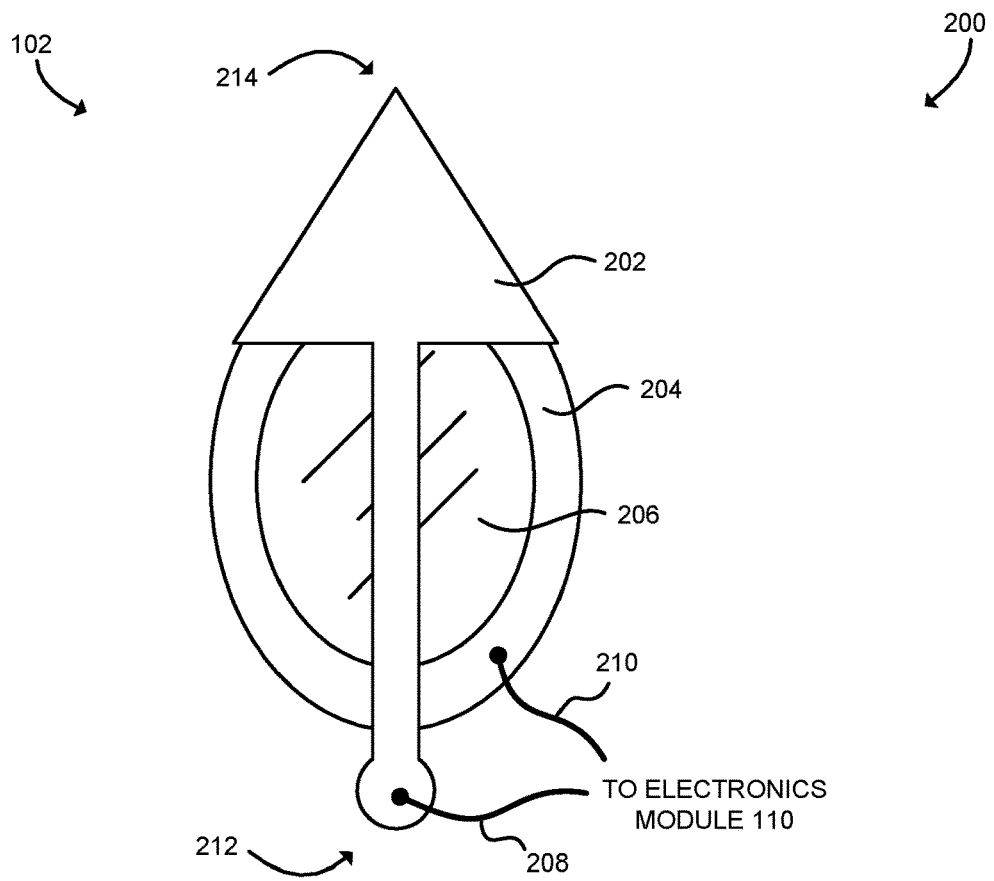
FIG. 2 is a schematic diagram illustrating at least one embodiment of a multifunction sensor device of the system of FIG. 1.

Referring now to FIG. 2, a static sensor device 200 is one illustrative embodiment of a multifunction sensor device 102. The sensor device 200 includes an electrode 202 and an electrode 204 separated by a thin film polymer 206. Each of the electrodes 202, 204 is formed from a flexible, metallic material such as a thin copper sheet. As shown, the electrode 204 has a rounded oval, disc, or circular shape. The electrode 202 has an elongated shape extending from one end 212 to another end 214. The end 214 is pointed and extends beyond the outer perimeter of the electrode 204. This elongated and/or pointed shape may increase charge affinity of the electrode 202. Although illustrated as having a general arrow shape, it should be understood that in other embodiments the electrode 202 may have any elongated and/or pointed shape. Of course, in some embodiments, the electrode 202 may have a rounded oval, disc, or circular shape similar to the electrode 204. In those embodiments, the electrode 202 may have reduced charge affinity as compared to embodiments having a pointed end 214 of the electrode 202.

The thin film polymer 206 may be embodied as a common polymer or composite material such as polyethylene, polyethylene terephthalate (PET), polyimide, polyvinylidene chloride, or another polymer film. In some embodiments, the thin film polymer 206 may include metallic nanoparticles, a metallic nanoparticle layer, or a metallic nanoparticle coating. Illustratively, the thin film polymer 206 is shaped in a disc with a diameter of about 0.5 cm. In other embodiments, the thin film polymer 206 may have a different diameter, such as 0.75 cm or another diameter.

The illustrative sensor device 200 includes a pair of wire leads 208, 210 coupled to the electrodes 202, 204, respectively. The wire leads 208, 210 couple the sensor 200 to the electronics module 110 shown in FIG. 1. In particular, the illustrative lead 208 couples the electrode 202 to a DC power supply, which is illustratively a 5 V DC power supply. The illustrative lead 210 is coupled to the nano-amplifier 120 of the electronics module 110. In use, when power is supplied to the electrode 202, a small steady-state current flows through the thin film polymer 206 to the electrode 204 due to the high resistance of the thin film polymer 206. When an electric charge is brought near the sensor 200, voltage on the electrode 204 changes, which produces a voltage signal that is provided to the nano-amplifier 120. The nano-amplifier 120 amplifies the voltage signal and provides the amplified voltage signal to one or more controllers 112, which perform further processing on the voltage signal. Thus, the sensor 200 may detect electrostatic charge and/or atmospheric ionization caused by imminent lightning strikes, electrical transmission equipment, or other sources.

Figure 3:
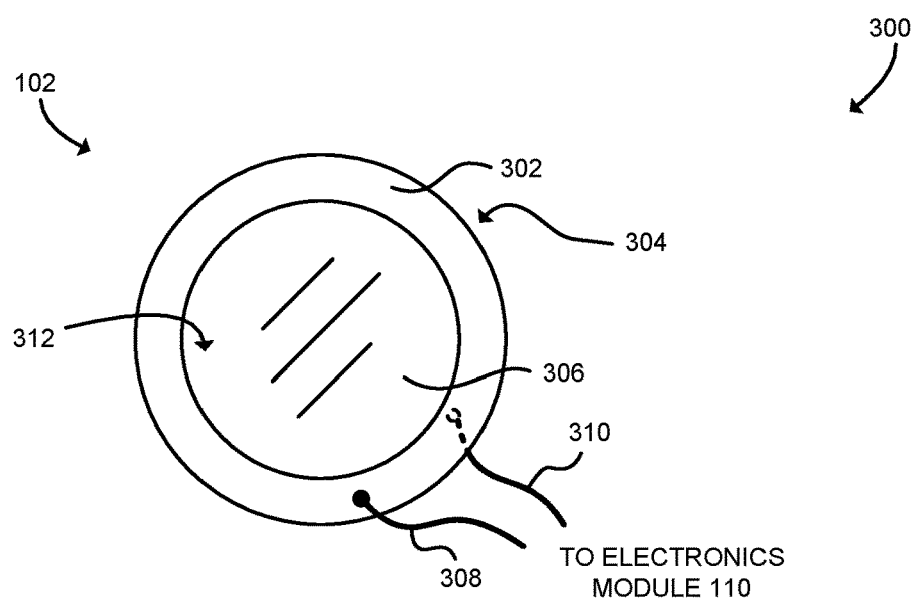
FIG. 3 is a schematic diagram illustrating at least one embodiment of another multifunction sensor device of the system of FIG. 1.

Referring now to FIG. 3, a single-layer high-energy particle sensor device 300 is one illustrative embodiment of a multifunction sensor device 102. The sensor device 300 includes an electrode 302 and an electrode 304 separated by a thin film polymer 306. Each of the electrodes 302, 304 is formed from a flexible, metallic material such as a thin copper sheet. As shown, each electrode 302, 304 has a rounded ring, disc, or circular shape. The thin film polymer 306 may be embodied as a common polymer or composite material such as polyethylene, polyethylene terephthalate (PET), polyimide, polyvinylidene chloride, or another polymer film. In some embodiments, the thin film polymer 306 may include metallic nanoparticles, a metallic nanoparticle layer, or a metallic nanoparticle coating. Illustratively, the thin film polymer 306 is shaped in a disc with a diameter of about 0.5 cm. In other embodiments, the thin film polymer 306 may have a different diameter, such as 0.75 cm or another diameter. The thin film polymer 306 may be formed from a material that is resistant to degradation by high-energy particle radiation. As shown in FIG. 3, the ring-shaped electrodes 302, 304 surround the thin film polymer 306 and define an aperture 312. The thin film polymer 306 is accessible to particle flux through the aperture 312.

The illustrative sensor device 300 includes a pair of wire leads 308, 310 coupled to the electrodes 302, 304, respectively. The wire leads 308, 310 couple the sensor 300 to the electronics module 110 shown in FIG. 1. In particular, the illustrative lead 308 couples the electrode 302 to a DC power supply, which is illustratively a 5 V DC power supply. The illustrative lead 310 is coupled to the nano-amplifier 120 of the electronics module 110. In use, when power is supplied to the electrode 302, a small steady-state current flows through the thin film polymer 306 to the electrode 304 due to the high resistance of the thin film polymer 306. When a high-energy particle such as a neutron strikes the surface of the thin film polymer 306, an anomaly in the current path is created (e.g., due to ionization caused by the high-energy particle), which produces a change in voltage on the electrode 304. The voltage signal produced at the electrode 304 may be proportional to the intensity of the high-energy particle flux through the thin film polymer 306. This voltage signal from the electrode 304 is provided to the nano-amplifier 120, which amplifies the voltage signal and provides the amplified voltage signal to one or more controllers 112, which perform further processing on the voltage signal.

Figure 4:
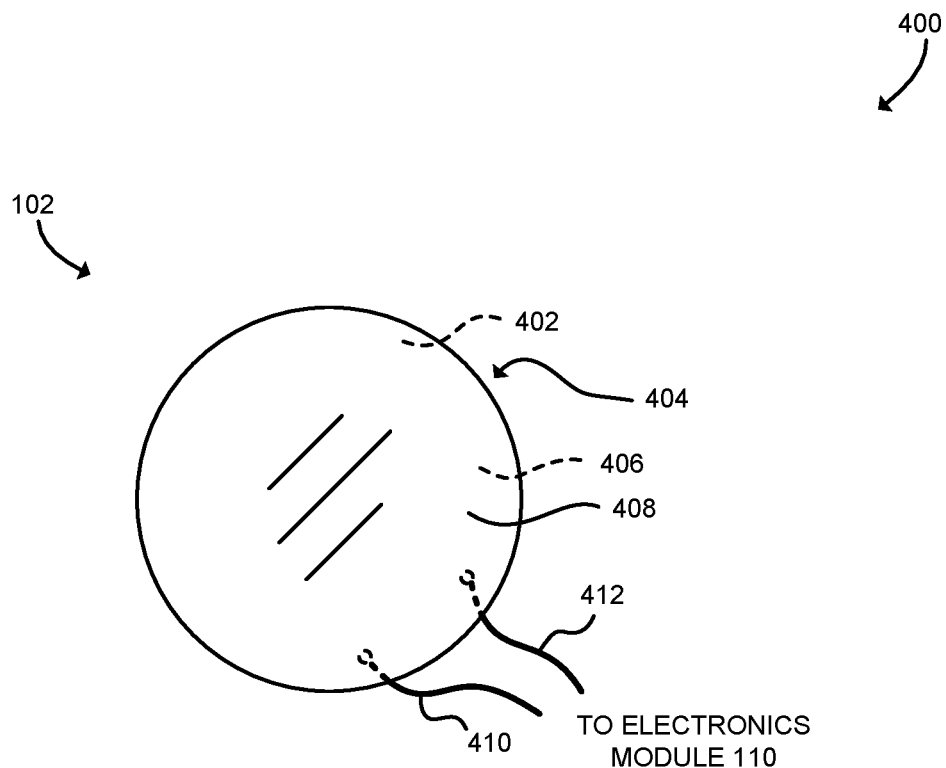
FIGS. 4-5 are schematic diagram illustrating at least one embodiment of another multifunction sensor device of the system of FIG. 1.
Figure 5:
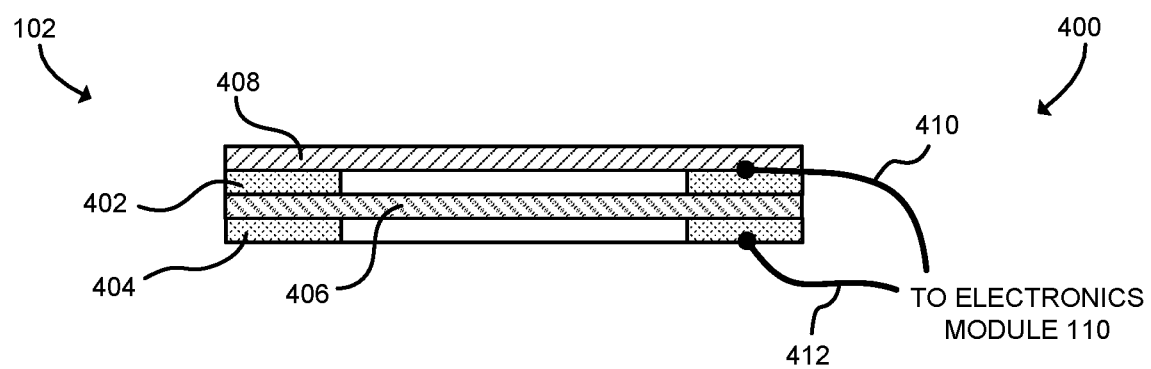

Referring now to FIGS. 4 and 5, a double-layer high-energy particle sensor device 400 is one illustrative embodiment of a multifunction sensor device 102. The sensor device 400 includes an electrode 402 and an electrode 404 separated by a thin film polymer 406. The sensor device 400 further includes an additional thin film polymer 408 positioned over the electrode 402, opposite from the thin film polymer 406. Each of the electrodes 402, 404 is formed from a flexible, metallic material such as a thin copper sheet. As shown, each electrode 402, 404 has a rounded ring, disc, or circular shape. Each of the thin film polymers 406, 408 may be embodied as a common polymer or composite material such as polyethylene, polyethylene terephthalate (PET), polyimide, polyvinylidene chloride, or another polymer film. The thin film polymers 406, 408 may each be formed from the same material or from different materials. In some embodiments, one or more of the thin film polymers 406, 408 may include metallic nanoparticles, a metallic nanoparticle layer, or a metallic nanoparticle coating. Illustratively, each thin film polymer 406, 408 is shaped in a disc with a diameter of about 0.5 cm. In other embodiments, the thin film polymers 406, 408 may have a different diameter, such as 0.75 cm or another diameter. Each thin film polymer 406, 408 may be formed from a material that is resistant to degradation by high-energy particle radiation.

The illustrative sensor device 400 includes a pair of wire leads 410, 412 coupled to the electrodes 402, 404, respectively. The wire leads 410, 412 couple the sensor 400 to the electronics module 110 shown in FIG. 1. In particular, the illustrative lead 410 couples the electrode 402 to a DC power supply, which is illustratively a 5 V DC power supply. The illustrative lead 412 is coupled to the nano-amplifier 120 of the electronics module 110. In use, when power is supplied to the electrode 402, a small steady-state current flows through the thin film polymer 406 to the electrode 404 due to the high resistance of the thin film polymer 406. When a high-energy particle such as a neutron strikes the surface of the thin film polymer 406 or the surface of the thin film polymer 408, an anomaly in the current path is created, which produces a change in voltage on the electrode 404. The voltage signal produced at the electrode 404 may be proportional to the intensity of the high-energy particle flux through the thin film polymer 406. This voltage signal from the electrode 404 is provided to the nano-amplifier 120, which amplifies the voltage signal and provides the amplified voltage signal to one or more controllers 112, which perform further processing on the voltage signal. The double-layer sensor device 400 may generate a higher voltage signal for the same particle flux as compared to the single-layer sensor device 300 of FIG. 3.

Figure 6:
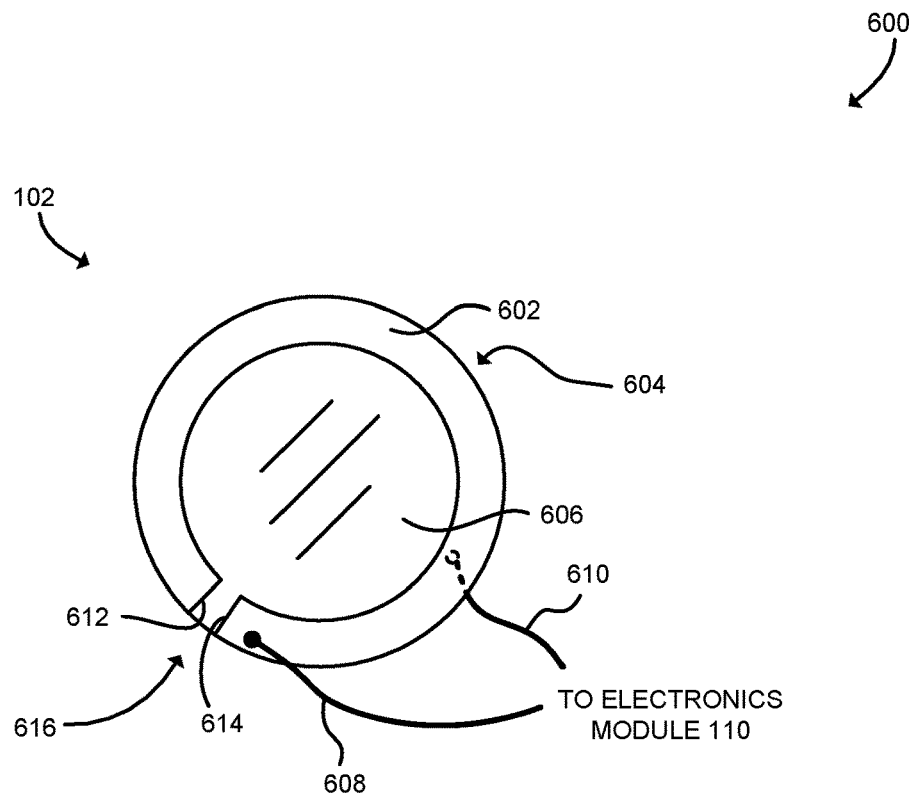
FIG. 6 is a schematic diagram illustrating at least one embodiment of still another multifunction sensor device of the system of FIG. 1.

Referring now to FIG. 6, a microwave radiation sensor device 600 is one illustrative embodiment of a multifunction sensor device 102. The sensor device 600 includes an electrode 602 and an electrode 604 separated by a thin film polymer 606. Each of the electrodes 602, 604 is formed from a flexible, metallic material such as a thin copper sheet. As shown, each electrode 602, 604 has a rounded ring, disc, or circular shape. The electrode 602 is a partial ring that extends from an end 612 to another end 614. The ends 612, 614 are separated by a gap 616. The electrode 604 may be a complete ring.

The thin film polymer 606 may be embodied as a common polymer or composite material such as polyethylene, polyethylene terephthalate (PET), polyimide, polyvinylidene chloride, or another polymer film. In some embodiments, the thin film polymer 606 may include metallic nanoparticles, a metallic nanoparticle layer, or a metallic nanoparticle coating. Illustratively, the thin film polymer 606 is shaped in a disc with a diameter of about 0.5 cm. In other embodiments, the thin film polymer 606 may have a different diameter, such as 0.75 cm or another diameter.

The illustrative sensor device 600 includes a pair of wire leads 608, 610 coupled to the electrodes 602, 604, respectively. The wire leads 608, 610 couple the sensor 600 to the electronics module 110 shown in FIG. 1. In particular, the illustrative lead 608 couples the electrode 602 to a DC power supply, which is illustratively a 5 V DC power supply. The illustrative lead 610 is coupled to the nano-amplifier 120 of the electronics module 110. In use, when power is supplied to the electrode 602, a small steady-state current flows through the thin film polymer 606 to the electrode 604 due to the high resistance of the thin film polymer 606. The electrode 602 including the gap 616 acts as an antenna and resonates in response to microwave radiation. The electrode 602 is coupled with the electrode 604 and thus generates a voltage signal at the electrode 604 in the presence of microwave radiation. This voltage signal from the electrode 604 is provided to the nano-amplifier 120, which amplifies the voltage signal and provides the amplified voltage signal to one or more controllers 112, which perform further processing on the voltage signal.

Figure 10:
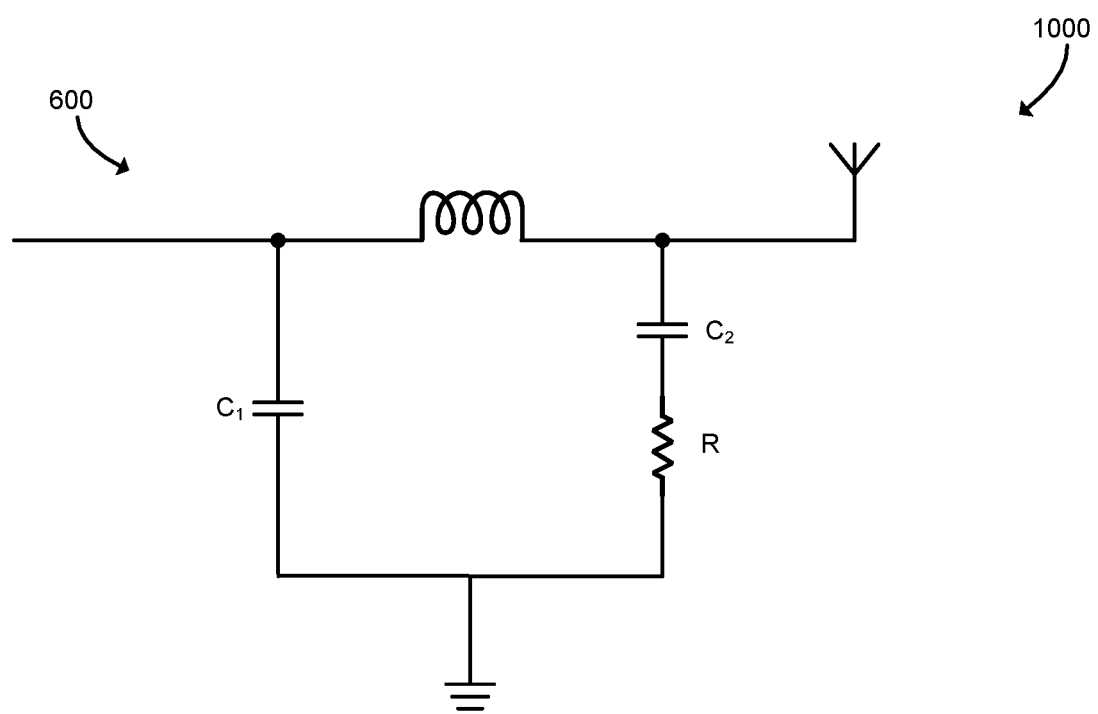
FIG. 10 is a schematic diagram of an auto-configured circuit that may be established by a multifunction sensor device of FIG. 6.

Referring now to FIG. 10, schematic diagram 1000 illustrates an automatically configured circuit that may be established by the sensor device 600. As shown, by including the gap 616 in the electrode 602, an inductor is formed, which acts as an antenna. Thus, the illustrative automatically configured circuit provides for detection of radiation in the electromagnetic spectrum as described above.

Figure 7:
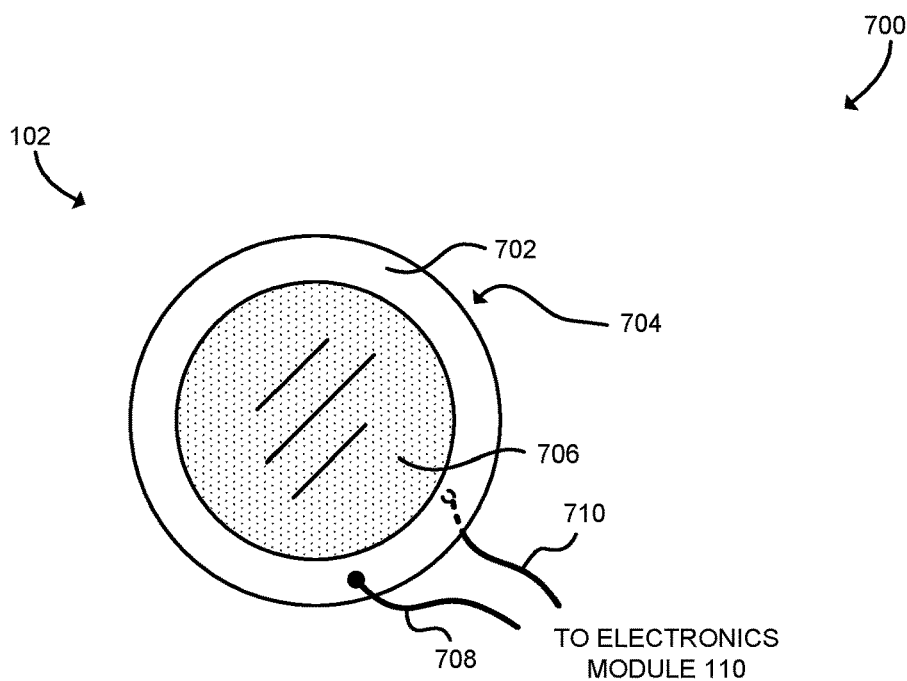
FIG. 7 is a schematic diagram illustrating at least one embodiment of yet another multifunction sensor device of the system of FIG. 1.

Referring now to FIG. 7, an ultraviolet (UV)/X-ray radiation sensor device 700 is one illustrative embodiment of a multifunction sensor device 102. The sensor device 700 includes an electrode 702 and an electrode 704 separated by a thin film polymer 706. Each of the electrodes 702, 704 is formed from a flexible, metallic material such as a thin copper sheet. As shown, each electrode 702, 704 has a rounded ring, disc, or circular shape. The thin film polymer 706 may be embodied as a common polymer or composite material such as polyethylene, polyethylene terephthalate (PET), polyimide, polyvinylidene chloride, or another polymer film. As shown, the thin film polymer 706 also includes metallic nanoparticles, a metallic nanoparticle layer, or a metallic nanoparticle coating. Illustratively, the thin film polymer 706 is shaped in a disc with a diameter of about 0.5 cm. In other embodiments, the thin film polymer 706 may have a different diameter, such as 0.75 cm or another diameter.

The illustrative sensor device 700 includes a pair of wire leads 708, 710 coupled to the electrodes 702, 704, respectively. The wire leads 708, 710 couple the sensor 700 to the electronics module 110 shown in FIG. 1. In particular, the illustrative lead 708 couples the electrode 702 to a DC power supply, which is illustratively a 5 V DC power supply. The illustrative lead 710 is coupled to the nano-amplifier 120 of the electronics module 110. In use, when power is supplied to the electrode 702, a small steady-state current flows through the thin film polymer 706 to the electrode 704 due to the high resistance of the thin film polymer 706. When ultraviolet radiation, X-ray radiation, or other relatively high-energy electromagnetic radiation passes through the sensor 700, the metallic nanoparticle component induces a dual capacitance to direct charges to the electrodes 702, 704 creating a voltage potential on the electrode 704. This voltage signal from the electrode 704 is provided to the nano-amplifier 120, which amplifies the voltage signal and provides the amplified voltage signal to one or more controllers 112, which perform further processing on the voltage signal. It should be understood that in some embodiments, the UV/X-ray sensor 700 may be structurally similar and/or identical to another sensor such as the single-layer high-energy particle sensor 300.

Figure 8:
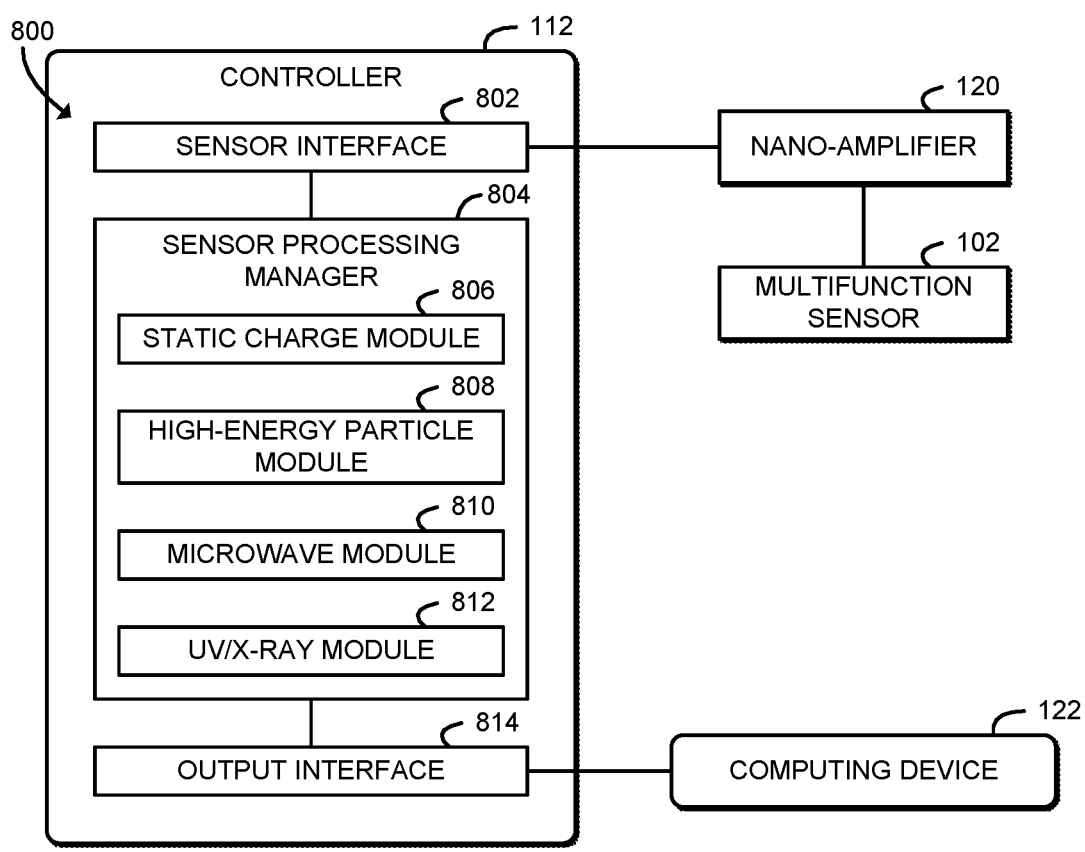
FIG. 8 is a simplified block diagram of at least one embodiment of an environment that may be established by a controller of the system of FIG. 1.

Referring now to FIG. 8, in the illustrative embodiment, a controller 112 establishes an environment 800 during operation. The illustrative environment 800 includes a sensor interface 802, a sensor processing manager 804, and an output interface 814. The various components of the environment 800 may be embodied as hardware, firmware, software, or a combination thereof. As such, in some embodiments, one or more of the components of the environment 800 may be embodied as circuitry or a collection of electrical devices (e.g., sensor interface circuitry 802, sensor processing circuitry 804, and/or output interface circuitry 814). It should be appreciated that, in such embodiments, one or more of those components may form a portion of the processor 114, the memory 116, the interface 118, and/or other components of the controller 112.

The sensor interface 802 is configured to receive an amplified sensor signal from the nano-amplifier 120 coupled to a multifunction sensor device 102. The multifunction device 102 may be embodied as, for example, a static sensor 200, a high-energy particle sensor 300, 400, a microwave sensor 600, and/or a UV/X-ray sensor 700.

The sensor processing manager 804 is configured to process the amplified sensor signal based on a type of the multifunction sensor device 102 to generate sensor data. Processing the amplified sensor signal may include converting the amplified sensor signal into sensor data that includes multiple of digital sensor values. Processing the amplified sensor signal may include determining one or more coefficients based on the type of the multifunction sensor device 102 and determining the sensor data as a function of those one or more coefficients. The type of the multifunction sensor device 102 may include a static charge sensor, a high-energy particle sensor, a microwave sensor, or an ultraviolet/X-ray sensor. The type of the sensor device 102 and/or the one or more coefficients may be configured by, for example, saving one or more values in a firmware device or other memory 116 of the controller 112. In some embodiments, one or more of those functions may be performed by sub-components such as a static charge module 806, a high-energy particle module 808, a microwave module 810, and/or a UV/X-ray module 812.

The output interface 814 is configured to output the sensor data after processing. Outputting the sensor data may include outputting the sensor data to a computing device 122 via a serial link or storing the sensor data with a data storage device (e.g., a memory 116 of the controller 112, a storage device 130 of a computing device 122, or another storage device).

Figure 9:
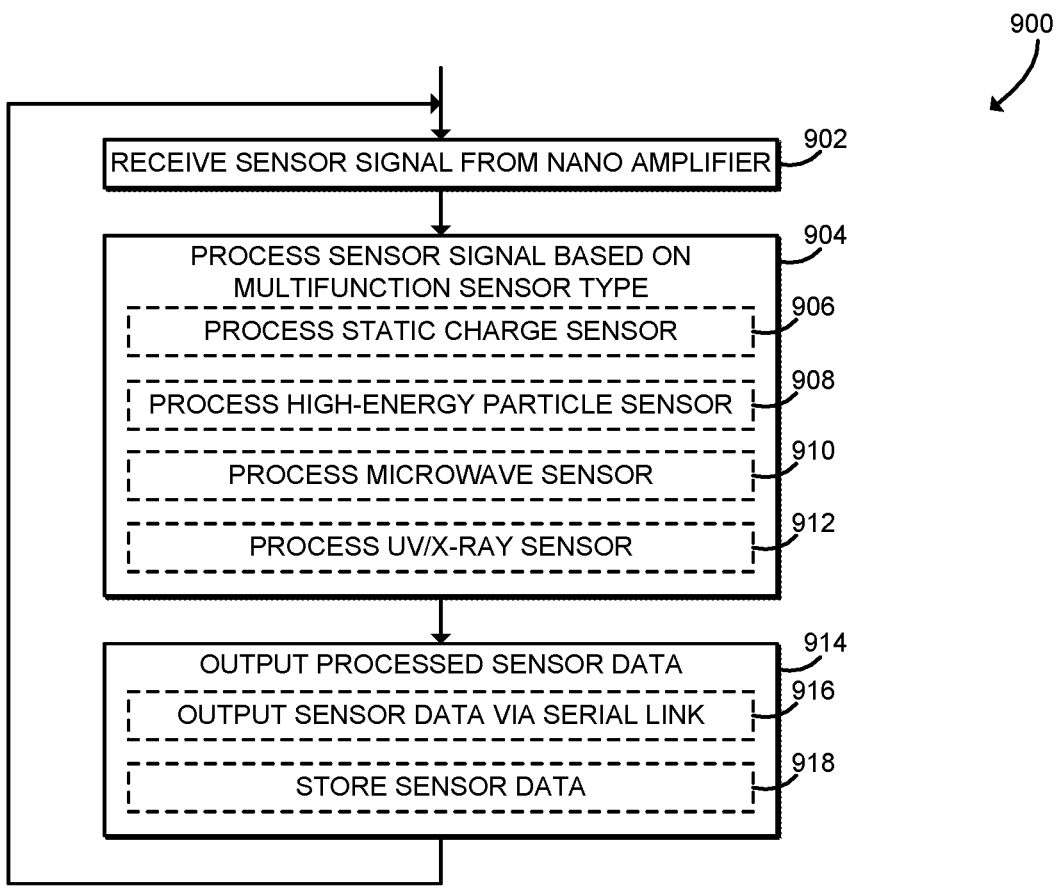
FIG. 9 is a simplified flow diagram of at least one embodiment of a method for environmental sensing with a multifunction sensor device that may be executed by the controller of FIGS. 1 and 8.

Referring now to FIG. 9, in use, a controller 112 may execute a method 900 for processing a sensor signal. It should be appreciated that, in some embodiments, the operations of the method 900 may be performed by one or more components of the environment 800 of the controller 112 as shown in FIG. 8. The method 900 begins with block 902, in which the controller 112 receives a sensor signal from the nano-amplifier 120. The sensor signal may be an amplified voltage signal generated by the nano-amplifier 120 that is based on a voltage signal received from one of the electrodes 104, 106 of the multifunction sensor device 102.

In block 904, the controller 112 processes the sensor signal based on the type of multifunction sensor device 102 in use. The controller 112 may process the sensor signal by, for example, converting the voltage signal into sensor data including one or more digital values representing the voltage signal. The controller 112 may process the sensor signal as a function of one or more coefficients. Each coefficient may be determined based on the type of multifunction sensor device 102 in use. For example, one or more memory addresses, firmware variables, or other storage locations may be configured with the appropriate coefficient based on the type of multifunction sensor device 102. The controller 112 may perform additional processing of the sensor signal, for example performing peak detection, filtering, In some embodiments, in block 906 the controller 112 may process a sensor signal produced by a static electricity sensor 200 as shown in FIG. 2. In those embodiments, the sensor 200 generates an increase in voltage in the presence of static charge and/or charged ions in the environment. In some embodiments, in block 908 the controller 112 may process a sensor signal produced by a high-energy particle sensor 300 as shown in FIG. 3 or a high-energy particle sensor 400 as shown in FIGS. 4-5. In those embodiments, the sensor 300, 400 generates a voltage signal when a high-energy particle such as a neutron strikes the polymer film 108. In some embodiments, in block 910 the controller 112 may process a sensor signal produced by a microwave sensor 600 as shown in FIG. 6. In those embodiments, the sensor 600 generates a voltage signal when microwave radiation interacts with one or more of the electrodes 104, 106. In some embodiments, in block 912 the controller 112 may process a sensor signal produced by a UV/X-ray sensor 700 as shown in FIG. 7. In those embodiments, the sensor 700 generates a voltage signal when UV and/or X-ray radiation strikes the polymer film 108.

In block 914, controller 112 outputs the processed sensor data. The controller 112 may output the sensor data using any appropriate data format and/or communication protocol. In some embodiments, in block 916 the controller 112 may output the sensor data to an external computing device 122 via a serial link. For example, the sensor data may be output as digital values over a UART serial connection or other communications link. The computing device 122 may graph or otherwise display the sensor data received from the controller 112. The computing device 122 may also perform additional processing on the sensor data. In some embodiments, in block 918 the controller 112 may store the sensor data. The controller 112 may store the sensor data in the memory 116, in a data storage device coupled to the controller 112, in an external storage device, or in any other data storage. The sensor data may be stored in any appropriate format, such as a tabular format, a text-based delimited format, or other format suitable for additional processing. In some embodiments, the sensor data may also be transmitted to a computing device 122 via a serial link for storage or other processing. After outputting the sensor data, the method 900 loops back to block 902 to continue processing sensor signals received from the multifunction sensor device 102.

The invention claimed is:

1. A multifunction sensor device comprising:
a first electrode;
a second electrode, wherein the first electrode and the second electrode are flat;
a thin film polymer positioned between the first electrode and the second electrode; and
a second thin film polymer coupled to the first electrode, wherein the second thin film polymer is positioned opposite the thin film polymer; and
a controller coupled to the first electrode and the second electrode and configured to process sensor signal data based on a type of the multifunction sensor device to generate sensor data;
wherein the first electrode comprises a metallic sheet and the second electrode comprises a metallic sheet, wherein the first electrode and the second electrode have equal area.

2. The multifunction sensor device of claim 1, wherein each of the first electrode, the second electrode and the thin film polymer are flexible.

3. The multifunction sensor device of claim 1, wherein the first electrode is coated with an environmentally resistant coating.

4. The multifunction sensor device of claim 1, wherein:
the first electrode extends from a first end to a second end, wherein the second end is pointed;
the second electrode comprises a ring that surrounds the thin film polymer; and
the second end of the first electrode extends beyond the ring of the second electrode.

5. The multifunction sensor device of claim 1, wherein:
the first electrode comprises a ring that defines a first aperture that opens onto the thin film polymer; and
the second electrode comprises a ring that defines a second aperture that opens onto the thin film polymer.

6. The multifunction sensor device of claim 1, wherein:
the first electrode comprises a partial ring that extends from a first end to a second end, wherein a slot is defined between the first end and the second end, and wherein the partial ring defines a first aperture that opens onto the thin film polymer; and
the second electrode comprises a ring that defines a second aperture that opens onto the thin film polymer.

7. The multifunction sensor device of claim 1, wherein the thin film polymer comprises a metallic nanoparticle layer.

8. The multifunction sensor device of claim 7, wherein the thin film polymer comprises aluminum nanoparticles.

9. The multifunction sensor device of claim 7, wherein the first electrode is coated with an anti-static coating.

10. A system for multifunction sensor processing, the system comprising:
a multifunction sensor device comprising (i) a first electrode, (ii) a second electrode, wherein the first electrode and the second electrode are flat, and (iii) a thin film polymer positioned between the first electrode and the second electrode;
a nano-amplifier coupled to the multifunction sensor device, wherein the nano-amplifier is configured to (i) receive a sensor signal from the multifunction sensor device and (ii) amplify the sensor signal to generate an amplified sensor signal; and
a controller coupled to the nano-amplifier, the controller configured to (i) receive the amplified sensor signal from the nano-amplifier, (ii) process the amplified sensor signal based on a type of the multifunction sensor device to generate sensor data, and (iii) output the sensor data.

11. The system of claim 10, wherein the first electrode is coupled to a constant voltage source and the second electrode is coupled to the nano-amplifier.

12. The system of claim 10, further comprising a computing device coupled to the controller via a serial link, wherein to output the sensor data comprises to output the sensor data to the computing device via the serial link.

13. One or more non-transitory, computer-readable storage media comprising a plurality of instructions that, when executed, cause a controller to:
receive an amplified sensor signal from an amplifier coupled to a multifunction sensor device;
process the amplified sensor signal based on a type of the multifunction sensor device to generate sensor data; and
output the sensor data.

14. The one or more non-transitory, computer-readable storage media of claim 13, wherein to process the amplified sensor signal comprises to convert the amplified sensor signal into the sensor data, wherein the sensor data comprises a plurality of digital sensor values.

15. The one or more non-transitory, computer-readable storage media of claim 13, wherein to process the amplified sensor signal comprises to determine a coefficient based on the type of the multifunction sensor device and determine the sensor data as a function of the coefficient.

16. The one or more non-transitory, computer-readable storage media of claim 15, wherein the type of the multi-function sensor device comprises a static charge sensor, a high-energy particle sensor, a microwave sensor, or an ultraviolet/X-ray sensor.

17. The one or more non-transitory, computer-readable storage media of claim 13, wherein to output the sensor data comprises to output the sensor data to a computing device via a serial link.

18. The one or more non-transitory, computer-readable storage media of claim 13, wherein to output the sensor data comprises to store the sensor data with a data storage device.

\* \* \* \* \*